United States Patent Office 3,230,040
Patented Jan. 18, 1966

3,230,040
TRIMETAPHOSPHATE PROCESSES
Joe S. Metcalf, Webster Groves, and Chung Yu Shen, Olivette, Mo., assignors to Monsanto Company, a corporation of Delaware
No Drawing. Filed Jan. 2, 1962, Ser. No. 163,887
6 Claims. (Cl. 23—106)

The present invention relates to novel processes for manufacturing inorganic alkali metal phosphate products that contain sodium trimetaphosphate. More particularly, the present invention relates to improved calcining processes for manufacturing sodium trimetaphosphate and mixed alkali metal trimetaphosphate products that contain a minimum amount of water-insoluble metaphosphates.

Perhaps the greatest problem facing those manufacturers of inorganic phosphate products who desire to make and sell alkali metal trimetaphosphates (such as sodium trimetaphosphate) on a commercial scale is the problem of producing trimetaphosphate products containing relatively small amounts (i.e. less than about 0.5 weight percent) of water-insoluble metaphosphates (commonly referred to as "IMP") via a commercially practical process. Heretofore the manufacture of alkali metal trimetaphosphates having very low levels of IMP was a very difficult task, and was usually prohibitively expensive. For example, it has been suggested that sodium trimetaphosphate can be made by calcining monosodium orthophosphate at temperatures above about 450° C. until the IMP level of the sodium trimetaphosphate product is reduced to an acceptable level. However, this procedure has heretofore been found to require a prolonged "soaking" period for the calcined material at temperatures above about 450° C., and for this reason was largely commercially impractical. Since, for many commercial processes and applications in which the alkali metal trimetaphosphates can be used it is desirable (and sometimes a requirement) that the alkali metal trimetaphosphate be practically completely soluble in water, the importance of a solution to this problem can readily be appreciated.

Consequently, it is a primary object of the present invention to provide calcination processes whereby sodium trimetaphosphate and mixed alkali metal trimetaphosphates that are essentially free of IMP can be manufactured in a significantly shorter period of time than was heretofore conventionally possible.

It is another object of the present invention to provide calcining processes for preparing relatively pure sodium trimetaposphate at a significantly lower cost than was heretofore possible.

These objects, as well as others, can be accomplished, in accordance with the present invention by raising the temperature of the "raw" phosphatic materials in the calciner feed stream through the temperature range of from about 250° C. to about 450° C. at an extremely fast rate. For example, in the manufacture of pure sodium trimetaphosphate from monosodium orthophosphate, it has been presently found that when the temperature of said monosodium orthophosphate is raised to about 550° C. from below about 100° C. in about 1 minute, the resulting product contains less than about 0.1 weight percent of IMP. This is a substantial improvement over conventional processes for manufacturing sodium trimetaphosphate, whereby products containing as much as 5–6 weight percent of IMP (via a conventional counter-currently heated calciner process) and 4–5 weight percent of IMP (via a conventional co-currently heated calciner process) are typical of those that can be produced conventionally by heating monosodium orthophosphate to about 550° C.

The present invention can be utilized not only for the manufacture of pure sodium trimetaphosphate (i.e. where-in the ratio of $Na_2O/P_2O_5$ in the final product is essentially 1.0), but also for the manufacture of several mixtures of sodium trimetaphosphate with certain other alkali metal phosphate salts. Typical examples of the mixed alkali metal trimetaphosphates that can be advantageously produced in accordance with this invention are:

(a) Mixtures of the "pure" sodium trimetaphosphate with the double sodium potassium trimetaphosphate salt $Na_9K_3(P_3O_9)_4$ of sodium trimetaphosphate plus potassium trimetaphosphate;

(b) The double salt, $3NaPO_3 \cdot KPO_3$.

Practically any inorganic alkali metal phosphate salt can be utilized in the preparation of the calciner feed streams that are to be calcined in accordance with the present invention, provided they are substantially completely soluble in water to the extent of at least about 1 weight percent. Thus, if a 1 weight percent solution of the inorganic alkali metal phosphate salt in water is clear, the salt can be utilized in the processes of this invention. However, it is preferred that at least one of the "raw" phosphate salts in the calciner feed streams contain some water of constitution (as distinguished from water of hydration). Examples of the wide variety of phosphate salts that can be utilized as "raw" materials in the practice of this invention are monosodium orthophosphate, disodium orthophosphate, monopotassium orthophosphate, dipotassium orthophosphate, monolithium orthophosphate, sodium acid pyrophosphate, trisodium acid tripolyphosphate, potassium tripolyphosphate, sodium trimetaphosphate, sodium hexametaphosphate and Graham's salt. These calciner feed streams can be either aqueous (in the form of a solution or a slurry) or anhydrous, depending upon the particular calcining procedure that one desires to utilize.

In order to attain the optimum rates of heating described above, it is preferred, however, that the calciner feed stream contain essentially no free water. If the calciner feed stream is composed of only "dry" salts, for example, there is no need to furnish as much heat to the calcining process as would otherwise be required if the calciner feed stream contained a large amount of free water.

While some of the benefits of the present invention can be obtained no matter which of the above-described raw phosphatic materials are utilized in the calciner feed streams, and no matter how the calciner feed streams are prepared, for optimum results it has been found that the various alkali metal phosphate salts in the calciner feed streams should be very intimately admixed so that the feed stream is a fairly uniform blend of all of these salts. Perhaps the best way to achieve an extremely uniform, essentially "dry" calciner feed stream is to first dissolve (or slurry) the various "raw" phosphate materials into water, and subsequently remove most of the free water from the resulting mixture by evaporating it according to any of a number of conventional procedures (such as on a steam-heated drum dryer) prior to the calcining step of the present invention. Of course, no mixture of phosphate salts is necessary when the pure sodium trimetaphosphate is to be manufactured from monosodium orthophosphate. Another way of achieving an extremely intimate mixture of the phosphate salts that are utilized as raw materials for the calcining processes of this invention is to mechanically blend them after they have been ground to the finely-divided state (preferably so that at least about 80 weight percent of the particles of each of the raw phosphatic materials can be passed through a U.S. Standard 200-mesh screen). Other procedures for preparing fairly uniform calciner feed streams should now be readily apparent to those in the art, and can be utilized without detracting substantially from the benefits that can result from practicing this invention. Except for certain of the specific examples, below, the following discussion will appear to be directed solely to the use of monosodium orthophosphate in the calciner feed stream. It should be noted, however, that what is said with respect to this particular material is also true of the blends of raw phosphatic materials described heretofore, particularly where the blends are of the preferred (extremely uniform) type.

It has surprisingly been found that, for the very best results in the practice of the present invention, the temperature of the monosodium orthophosphate should be raised through the region of from about 250° C. to about 450° C. at as fast an average rate as possible in order to achieve an acceptably low level of IMP in the resulting trimetaphosphate products in as short a calcining time as possible. The invention is surprising because it was heretofore believed that an increase in the average heating rate of monosodium orthophosphate, for example, resulted in an increase in the IMP level of the final product rather than the desired decrease or elimination of it. This prior belief was apparently due to the fact that at conventional rates of heating it is true that increasing the average heating rate through the critical temperature range of from about 250° C. to about 450° C. actually results in an increase in the IMP level in the sodium trimetaphosphate product when it attains a temperature of about 500° C. For example, when an average heating rate of about 20° C. per minute is used, the product contains about 10 weight percent of IMP, while when a heating rate of about 50° C. per minute is used, the IMP level is as much as 50 weight percent of the final product. However, according to this invention, when average heating rates (through the critical temperature region) are used, the level of IMP in the resulting product is almost invariably below about 3 weight percent by the time the temperature of the materials being calcined reaches 500° C. The actual average heating rate that should be used in the practice of the invention depends upon several factors including the ultimate level of IMP desired in the particular trimetaphosphate product being manufactured, as well as the particular starting materials that are used. If certain raw materials that have a tendency in and of themselves to produce products having relatively low levels of IMP (such as, for example, small amounts of potassium orthophosphates) are used, relatively lower heating rates, down to as low as about 100° C. per minute can be used in the practice of this invention. However, in most instances, average heating rates of above about 175° C. per minute through the critical temperature range are preferred. When a heating rate of as high as about 350° C. per minute, for example, is utilized, the IMP level of the resulting trimetaphosphate product (when its temperature reaches about 500° C.) is less than about 0.25 weight percent. Still higher rates of heating result in still lower levels of IMP in the resulting trimetaphosphate products. Thus, for optimum results in the practice of the present invention, rates of heating of the "raw" phosphatic calciner feeds (through the temperature region of from about 250° C. to about 450° C.) should be higher than about 225° C. per minute. It should also be noted that even when materials such as potassium orthophosphates (that have a tendency to reduce the level of IMP in the calcined products) are used as part of the raw materials for the processes of this invention, utilization of the high heating rates of this invention results in still lower levels of IMP in the trimetaphosphate products made thereby than was heretofore possible in such a short (calcining) time.

Since, except under unusual conditions, there is still some IMP in the alkali metal trimetaphosphate products after their temperautre is raised to above about 450° C. (even with the utilization of the extremely high rates of heating of the present invention), if it is desired to reduce the level of IMP still further, these products must generally be "soaked" at a temperature above about 450° C. (but below the melting point of the particular alkali metal trimetaphosphate product being treated), for an additional period of time. This "soaking" period can be varied from only a few minutes for products that have been treated in processes that utilize extremely high rates of heating (i.e., >225° C./minute) to more than 15–20 minutes for products that have been heated at the relatively slower rates of the present invention. By comparison, sodium trimetaphosphate that has been prepared by heating monosodium orthophosphate at still slower rates (for example, below about 20° C./minute) through the critical temperature range (250° C.–450° C.) require more than 10 hours of "soaking" at about 500° C. in order to reduce their IMP contents to an acceptable level (i.e. below about 0.5 weight percent).

The processes of this invention can be carried out in any calcining equipment capable of raising the temperature of any of the calciner feed streams described above through the temperature range of from about 250° C. to about 450° C. at a rate which exceeds about 175° C. per minute. Since it is often desirable that the phosphate salts be held at a temperature above about 450° C. for at least a few minutes after they have attained a desirable calcining temperature (above the temperature region that favors the formation of IMP), generally the particular equipment that is utilized should have, in addition to means for quickly raising the temperature of the feed stream, means for maintaining its temperature within the desired conversion (to trimetaphosphate) range described heretofore. Some specific examples of the type of equipment that can be used in the practice of the present invention are described in the following specific examples, which are by no means intended to illustrate the only manipulative procedures whereby the present invention can be practiced. Note that in the following examples, all parts are by weight unless otherwise specified.

EXAMPLE I

*Manufacture of mixed alkali metal trimetaphosphates*

Into 500 parts of water are dissolved 450 parts of monosodium orthophosphate and 50 parts of monopotassium orthophosphate. Almost all of the water is removed from the resulting solution by drying it on a conventional stainless steel, steam heated drum-dryer. The resulting drum-dried flakes are then passed once through a conventional hammer mill so that the particles (containing an intimate admixture of monosodium orthophosphate and monopotassium orthophosphate) are sufficiently reduced in size to pass through a U.S. standard 80-mesh screen. These finely-divided particles are then distributed over a thin stainless steel pan so that a fairly uniform layer of the mixed alkali metal orthophosphate salts about 0.2 centimeter deep is laid in the pan. The pan of orthophosphate salts is then passed slowly under a series of flaming jets which are directed onto the surface of the salts in the pan. The jets of flame are directed onto the moving bed of salts in such a way that the salts are not significantly fused in the process. Yet the temperature of the salts is raised to above about 450° C. in this manner in less than 30 seconds. The hot bed (pan) of salts is then moved into a insulated container the internal temperature of which is maintained at about 500° C., where it is held for about 10 minutes. After it is cooled, the resulting product is found to be completely soluble in water at the 10 weight percent level, and is essentially a mixture of 63.2 weight percent sodium trimetaphosphate and 36.8 weight percent of the $$3NaPO_3 \cdot KPO_3$$

double salt.

EXAMPLE II

*Manufacture of pure sodium trimetaphosphate*

Into a conventional glass-lined reaction vessel fitted with a fairly efficient stirrer are poured 85.5 parts of water and 96.1 parts of 85% phosphoric acid. Over a period of about 10 minutes, 44.2 parts of sodium carbonate are added to the acid solution while the acid solution is slowly stirred. After all of the carbon dioxide gas has been evolved there remains in the reaction vessel an aqueous solution containing 50 weight percent of monosodium orthophosphate. This solution is sprayed under high pressure (about 500 p.s.i.g.) directly into a stream of hot air which is entering a spraying tower. The temperature and volume of the hot air and the rate at which the solution is sprayed into the hot gases are such that within less than a minute the aqueous portion of the solution that was introduced into the spraying tower is completely evaporated and the temperature of the resulting "solids" is raised to above about 450° C. The temperature and volume of the hot air are also controlled so that the maximum temperature of these "solids" is maintained below 625° C. (the melting point of sodium trimetaphosphate). The resulting product, after only about two minutes of exposure to temperatures above about 450° C. is essentially pure sodium trimetaphosphate, containing less than 0.1 weight percent of IMP.

Table I, below, illustrates the effect of the rate of heating of monosodium orthophosphate on the IMP level in the resulting sodium trimetaphosphate product. Data for Table I were obtained by heating pure monosodium orthophosphate from about 30° C to 500° C. at the rates given in the first column. After the products were cooled to room temperature (within about 1–2 minutes of the time they had attained a temperature of 500° C.), they were analyzed for IMP content by both X-ray analysis and water solubility.

TABLE I.—*Rates of heating of monosodium orthophosphate versus IMP content of the resulting sodium trimetaphosphate*

| Heating rate:[1] | Weight percent IMP[2] |
|---|---|
| 20 | 10 |
| 51 | 55 |
| 175 | 1.5 |
| 340 | 0.20 |

[1] Degrees centigrade per minute.
[2] Based on total weight of sodium trimetaphosphate.

What is claimed is:

1. In a process for manufacturing sodium trimetaphosphate containing less than about 0.5 weight percent of water insoluble metaphosphate, which process comprises calcining monosodium orthophosphate having a ratio of Na/P of about 1.0 at a conversion temperature between about 450° C. and about 620° C., the improvement which comprises initially raising the temperature of said monosodium orthophosphate through the temperature range of from about 250° C. to about 450° C. at an average rate of at least about 175° C. per minute, maintaining the temperature of said monosodium orthophosphate between about 450° C. and about 620° C. until substantial conversion of said monosodium orthophosphate to sodium trimetaphosphate has taken place, and recovering said sodium trimetaphosphate from the calciner.

2. An improved process as in claim 1 wherein said average rate is at least about 225° C. per minute.

3. A calcining process for manufacturing the double sodium potassium trimetaphosphate salt, $Na_9K_3(P_3O_9)_4$ containing less than about 0.5 weight percent of water insoluble metaphosphate, which process comprises raising the temperature of a mixture of monosodium orthophosphate and monopotassium orthophosphate having an over-overall ratio of Na to K, respectively, of about 3:1, through the temperature range of from about 250° C. to about 450° C. at an average rate of at least about 100° C. per minute to a conversion temperature between about 450° C. and about 620° C., maintaining the temperature of said mixture between about 450° C. and about 620° C. until substantial conversion of said mixture to said double salt has taken place, and recovering said double salt from the calciner.

4. A process for manufacturing sodium trimetaphosphate containing less than about 0.5 weight percent of water insoluble metaphosphates, which process comprises calcining monosodium orthophosphate at a conversion temperature between about 450° C. and about 620° C.; said conversion temperature being attained by raising the temperature of said monosodium orthophosphate through the temperature range of from about 250° C. to about 450° C. in less than about 2 minutes, whereby said sodium trimetaphosphate is produced.

5. A process as in claim 4, wherein the temperature of said monosodium orthophosphate is raised through said temperature range in less than about 1 minute.

6. A process as in claim 3, wherein said average rate is at least about 175° C.

References Cited by the Examiner

UNITED STATES PATENTS

| 502,424 | 8/1893 | Precht | 23—106 |
| 2,055,332 | 9/1936 | Bryan | 23—106 |
| 2,358,965 | 9/1944 | Durgin et al. | 23—106 |
| 2,419,148 | 4/1947 | King | 23—106 |
| 3,030,180 | 4/1962 | Bigot | 23—106 |

FOREIGN PATENTS 1,050,737  2/1959  Germany.

MAURICE A. BRINDISI, *Primary Examiner*